United States Patent Office 3,116,309
Patented Dec. 31, 1963

3,116,309
HETEROCYCLIC COMPOUNDS CONTAINING RING CARBON, NITROGEN AND PHOSPHORUS OR ARSENIC ATOMS AND THEIR PREPARATION
Kurt H. G. Pilgram, Bonn-Dransdorf, and Friedrich W. A. G. K. Korte, Hangelar, Germany, assignors to Shell Oil Company, New York, N.Y., a corporation of Delaware
No Drawing. Filed July 23, 1962, Ser. No. 224,587
Claims priority, application Germany Sept. 28, 1961
15 Claims. (Cl. 260—440)

INTRODUCTION

This invention relates to novel heterocyclic compounds and to a process for their preparation. More particularly, the invention relates to certain heterocyclic compounds containing both nitrogen and phosphorus or arsenic in a single ring, and to the preparation of such compounds from aromatic diamines.

The novel componds of the invention are those heterocyclic compounds containing in one ring the structure

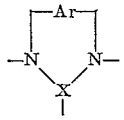

where Ar is a divalent aromatic radical and X is a trivalent group V element selected from the group consisting of phosphorus and arsenic. Compounds of this structure are useful as fire retardants, particularly for such plastics as cellulosic resins, e.g., cellulose acetate, and polyvinylic resins, e.g., polyvinyl chloride, and for wood and cellulosic fabrics. They show biological activity, and are useful as biocides, or as intermediates in the preparation of biocides. They may also be employed as lubricant additives, particularly as EP additives for grease.

PROCESS

The novel heterocyclic compounds of the invention may best be understood by a detailed consideration of the manner in which they are prepared. They are readily prepared by reacting together an aromatic diamine having up to two aromatic nuclei, with at least a diester of the formula $$RY_mX(YR)_2$$

wherein X is a group V element selected from the group consisting of phosphorus and arsenic, Y is oxygen or sulfur, R is a monovalent radical selected from the group consisting of the hydrogen atom and aryl, and $m$ is an integer from 0 to 1.

By aromatic diamines are meant those amines of the general structure $Ar(NHR)_2$ wherein Ar is a divalent radical selected from the group consisting of— six-membered mononuclear hydrocarbon rings, e.g., phenylene binuclear hydrocarbon rings made up of the above nuclei, e.g., naphthylene, biphenylene, and two six-membered mononuclear rings interconnected by a disulfide bridge, e.g., diphenylene disulfide, and R has the above meaning. Of these, representative compounds include o-phenylene diamine, N-phenyl-o-phenylene diamine, N-tolyl-o-phenylene diamine, N,N'-diphenyl-o-phenylene diamine, 1,8-naphthalene diamine, N-phenyl-1,8-naphthalene diamine, N,N'-ditolyl-1,8-naphthalene diamine, 2,2'-diaminodiphenyl N-xylyl-2,2'-diaminodiphenyl, N,N'-diphenyl-2,2'-diaminodiphenyl, 2,2'-diaminodiphenyldisulfide, N-phenyl-2,2'-diphenyl-2,2'-diaminodiphenyl, N-phenyl-2,2'-diaminodiphenyldisulfide, and N,N'-ditolyl-2,2'-diaminodiphenyldisulfide. All of these amines share the common characteristics that the amine group on each ring is ortho to either the other amine group in the ring or to the ring carbon atom closest to the nearest ring carbon atom of the second aromatic ring which is substituted with an amine group. As noted, the amines may be primary or secondary.

The aromatic amines described are reacted in liquid phase with at least diesters whose formula is $$RY_mX(YR)_2$$

where R, X, Y and $m$ have the above significance. Preferred as reactants are those diaryl esters obtained when $m$ is equal to zero, and particularly preferred are the aryl esters of the oxygen-containing acids, the aryl phosphonous and aryl arsonous acids.

When M is zero, representative esters include such phosphite esters as the diphenyl ester of p-tolyl phosphonous acid, the ditolyl ester of phenyl phosphonous acid, the diphenyl ester of phenyl phophonous acid, and the ditolyl ester of p-tolyl phosphonic acid. Representative of the general structure of such esters is the formula

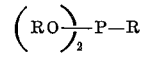

wherein each R is aryl. Preferred aryl radicals are those hydrocarbon mononuclear six-membered ring structures wherein the radical has no more than eight carbon atoms. The corresponding thioesters, e.g., the diphenyl ester of p-tolyl thiophosphonous acid, are equally effective as reactants in the process of the invention.

Representative esters of arsonous acid include the diphenyl ester of p-tolyl arsonous acid, the dixylyl ester of phenyl arsonous acid, the ditolyl ester of xylyl arsonous acid, and the like. Such esters are those of the structure

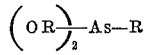

where R has the above significance. The corresponding aryl ester of thioarsonous acids, e.g., the diphenyl ester of p-tolyl arsonous acid, are also suitable reactants.

When $m$ is 1, the esters are the triaryl ester of phosphorus or arsenous acid or of thiophosphorous or thioarsenous acid.

Representative of the triaryl esters of phosphorus acid are triphenyl phosphite, tritolyl phosphite, trixylyl phosphite, phenyl ditolyl phosphite, and the like, as well as triphenyl trithiophosphite, tritolyl trithiophosphite, and the other corresponding triaryl trithioesters of phosphorous acid. Exemplary of the triaryl esters of arsenous acid are triphenyl arsenite, tritolyl arsenite, tri-xylyl arsenite and the corresponding esters of thioarsenous acid, e.g., triphenyltrithioarsenite and the like. The oxygen esters, which are the preferred reactants, have the general structure $$X(OR)_3$$

wherein X is phosphorous or arsenic and R is aryl, preferably mononuclear hydrocarbon aryl of up to 8 carbon atoms.

The aromatic diamine described and the group V ester are reacted together in any convenient proportions. If desired, a molar excess of either reactant may be employed, up to about 5 moles per mole of the other reactant being most convenient. Since the reaction proceeds satisfactorily when equimolar proportions of the amine and ester are employed, this proportion of reactants is preferred. Since the reactants are liquids under the conditions of the reaction, no solvent is required, although an inert organic solvent may be employed if desired. Useful solvents are those aliphatic or aromatic hydrocarbons which are liquids under the conditions of the reaction.

The reaction is conducted at elevated temperature and goes best under reduced pressure. A temperature range of from about 100° C. to about 300° C. has been found to be most effective for rapid conduct of the reaction, while the preferred range is from about 150° C. to about 200° C. Since at these temperatures the product phenols or thiophenols are relatively volatile, it is helpful to conduct the reaction under reduced pressure so as to remove these products from the reaction mixture. For this reason, conduct of the process at subatmospheric pressure is preferred, a pressure range of from about 0.01 to about 50 mm. Hg being convenient. The reduced pressures obtained from a water jet aspirator, on the order of 10 mm. Hg, are sufficient for most purposes.

Under the conditions described, the reaction readily goes to completion in a few hours, to afford the desired heterocyclic product in high yield. The heterocyclic product, being of higher molecular weight than the reactants or phenolic product, is readily recovered by fractional distillation or by other conventional techniques, e.g., washing, extraction, crystallization, or the like.

PRODUCTS

The product of the reaction described are those heterocyclic compounds containing a ring of the structure

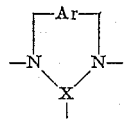

where, as noted above, X is an element of group V of the Mendeléeff Periodic Table, and may be phosphorus or arsenic.

The divalent radical Ar is preferably selected from the group consisting of the radicals

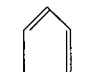

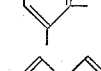

and

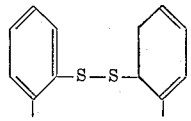

but the six-membered rings noted may have alkyl as well as hydrogen substituents if desired. Thus, the phenylene nucleus may have one or two methyl substituents, while the naphthylene and diphenylene moieties may have methyl, ethyl or isopropyl substituents. Preferred substituents are lower alkyl, of up to four carbon atoms, and up to two per ring are most preferred.

By appropriate selection of the diamine and ester reactants, heterocyclic compounds having from 5 to 9 atoms in the hetero ring may readily be obtained.

For example, a heterocyclic five-membered ring is formed when o-phenylene diamine is reacted with the diphenyl ester of p-tolyphosphonous acid:

(I)

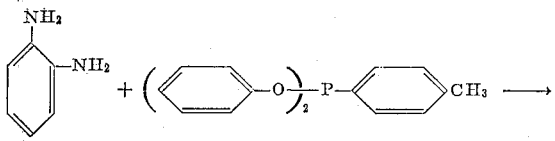

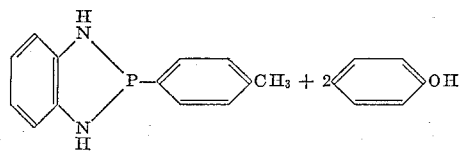

However, a six-membered ring is obtained when 1,8-naphthylene diamine is reacted with triphenyl phosphite (II)

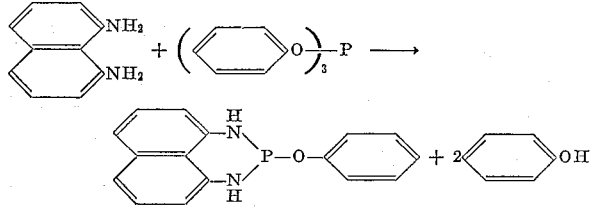

A seven-membered ring is obtained when another type of diamino aromatic compound, 2,2'-diaminodiphenyl, is reacted with triphenyl phosphite:

(III)

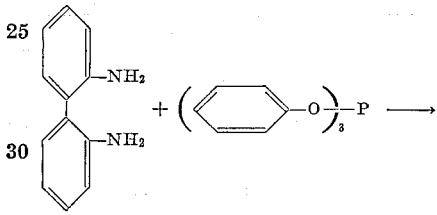

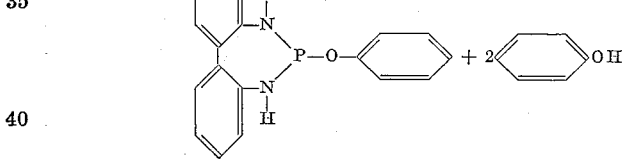

A nine-membered ring containing sulfur atoms in addition to the other hetero atoms described above, is obtained when 2,2'-diamino, diphenyl disulfide is reacted with triphenyl arsonite:

(IV)

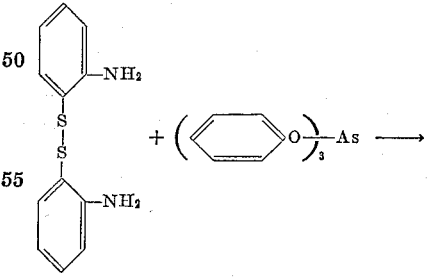

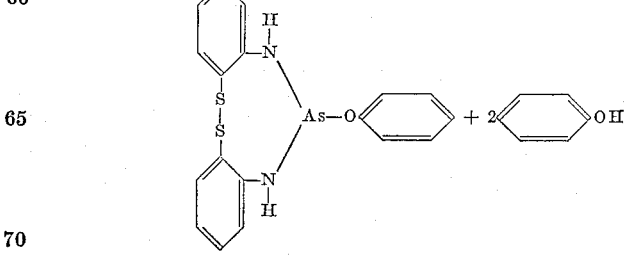

Upon conducting the reaction described at temperatures sufficiently elevated to split off the third phenol, preferably at temperatures near or in excess of about 200° C., another type of product containing a double bond attached to the group V atom is obtained. Such compounds have the ring structure

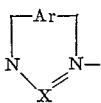

where Ar and X have the above significance.

For example, when N-phenyl-o-phenylene diamine is reacted at 180° C. with triphenyl phosphite, a substituted diazaphosphole is obtained:

(V)

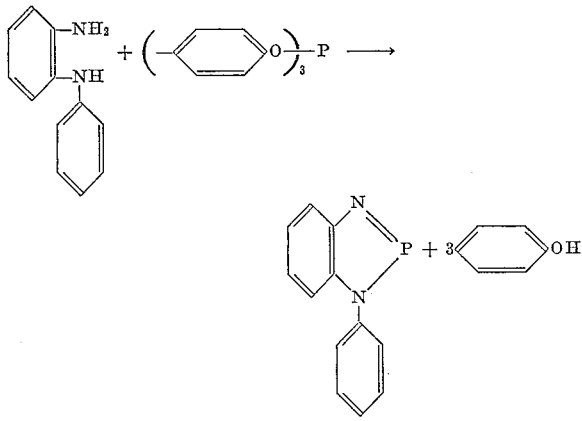

and a similar result is afforded when 2,2'-diaminodiphenyl is reacted at 200° C.

(VI)

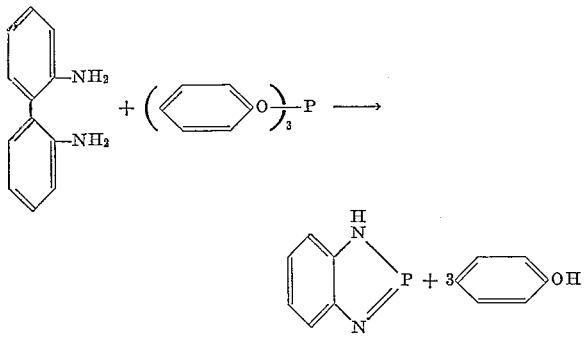

As in the above cases, the 2,2'-diaminodiphenyl disulfide also condenses with polyaryl esters at elevated temperatures to afford dithionine product.

(VII)

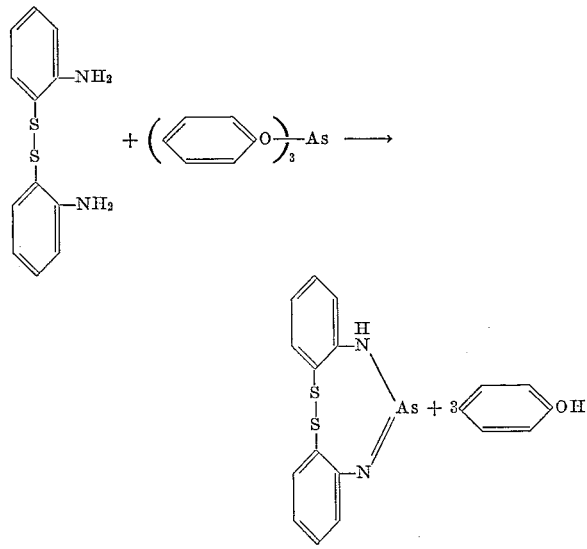

The products of the process described are white or light-colored crystalline solids having comparatively high melting points.

The following examples will illustrate the novel products of the invention and the manner in which they are prepared. It should be understood, however, that these examples are merely illustrative and are not to be regarded as limitations to the appended claims, since the basic teaching thereof may be varied at will, as will be understood by one skilled in the art. In the examples, the proportions are expressed in parts by weight unless otherwise noted.

*Example I*

1H,3H-2-p-TOLYL-BENZO(d)-1,3,2-DIAZAPHOSPHOLE

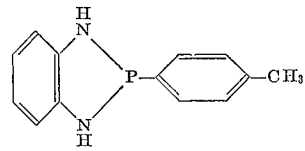

7.2 grams (0.075 mol) of o-phenylene diamine and 20.5 grams (0.075 mol)+1 gram excess of p-tolylphosphonous acid diphenyl ester were heated in an oil bath to 150° C. for 30 minutes with stirring and at a pressure of 10 mm. Hg (water jet vacuum). At 140° C. the diamine completely dissolved and the distillation of phenol started in the ice-cooled receiver. After 45 minutes the contents of the flask completely solidified to a greenish white mass. The yield of phenol was 12.9 grams (103% of theory), contaminated with some excess ester. The contents of the reaction flask weighed 14 grams (92% of theory) and melted at 210–220° C.

After recrystallization from toluene (an insoluble residue having a melting point of 249–255° C. remained behind), the product melted at 245–248° C.

$C_{13}H_{13}N_2P$ (228.2):

|  | N | P |
|---|---|---|
| Calculated | 12.27 | 13.60 |
| Found | 11.34 | 12.38 |

*Example II*

1-PHENYL-BENZO(d)-1,3,2-DIAZAPHOSPHOLE

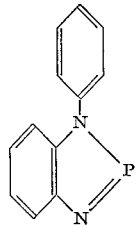

5.52 grams (0.03 mol) of N-phenyl-o-phenylene diamine and 93 grams (0.03 mol) of triphenylphosphite were heated, as in the previous example, in an oil bath to 150–160° C. for 4½ hours. Heating was continued at 180° C. and a pressure of 0.1 mm. Hg for another hour, when a solid substance separated off. The amount of phenol condensed in the ice-cooled receiver after this period of heating was 8.1 grams (95.8% of theory).

Solidification of the contents of the flask started after only approximately 6 grams of phenol had been formed. After cooling the colorless to light grey solid mass, it was reduced in a mortar and extracted once with xylene and three times with 100 ml. of ether. After removing the solvent, a light grey product was obtained in a yield of 4.8 grams (75.3% of theory). The material melted at 350° C. while decomposing.

$C_{12}H_9N_2P$ (212.2):

|  | N | P |
|---|---|---|
| Calculated | 13.19 | 14.62 |
| Found | 12.90 | 14.40 |

Example III
3H-2-PHENOXY-2-PHOSPHAPERIMIDINE

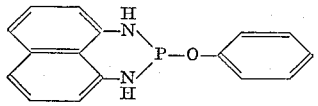

7.9 grams (0.05 mol) of naphthylene diamine-(1,8) and 15.5 grams (0.05 mol) of triphenylphosphite were introduced into a 50 ml. round-bottomed flask provided with a reflux condenser. The reaction mixture was then heated with stirring to a temperature of 180° C. in an oil bath at a pressure of 10 mm. Hg and the phenol formed in six hours (9.6 grams, corresponding to 102% of theory), condensed in an ice-cooled receiver. The crude product was then dissolved in xylene, boiled together with active carbon, filtered and slightly concentrated for the purpose of crystallizing.

When the whole was left to stand at room temperature, only little crystallizate separated off which had a melting point of 121–126° C. To increase the yield petroleum ether was added to the filtrate, the precipitate filtered off and again dissolved in xylene, petroleum ether being added until the solution began to cloud. Any impurities formed were decanted. The product was crystallized in carbon dioxide sol. Yield: 1.8 grams (12.85% of theory) of pink crystals having a melting point of 126–127° C.

$C_{16}H_{13}N_2OP$ (180.3):

|  | N | P |
|---|---|---|
| Calculated | 10.0 | 11.07 |
| Found | 9.9 | 11.20 |

Example IV
2-PHENOXY-DIBENZO(d,f)-1,3,2-DIAZOPHOSPHEPINE

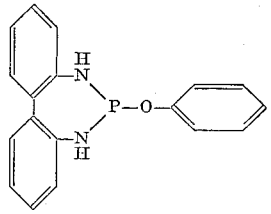

In the same manner as described in the previous example, 1.84 grams (0.01 mol) of 2,2'-diaminodiphenyl and 3.1 grams (0.01 mol) of triphenylphosphite were heated to 200–210° C. in an oil bath for six hours. The amount of phenol formed during this period was 1.9 grams (101% of theory).

The practically black reaction product was dissolved in xylene and precipitated with petroleum ether. The purifying process was repeated. The colorless amorphous precipitate was dried. A sample was put into a small tube after which the tube was sealed and heated. The product sintered at 130° C. and melted at 180° C.

On further heating crystals began to separate from the melted product at 280° C. and the latter finally solidified completely, phenol being condensed against the colder part of the wall of the tube. Most of the colorless amorphous product was again extracted with ether and dried in high vacuum at 90° C. The yield was 0.2 gram (6.53% of theory), the melting point was in the range of from 185° to 190° C.

$C_{18}H_{15}N_2OP$ (306.2):

|  | P |
|---|---|
| Calculated | 10.13 |
| Found | 10.20 |

Example V
2-PHENYL-DIBENZO(d,f)-1,3,2-DIAZAPHOSPHEPINE

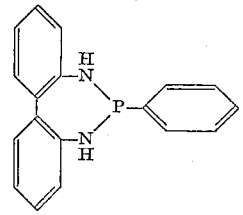

14.7 grams (0.05 mol) of phenylphosphonous acid diphenyl ester and 9.2 grams (0.05 mol) of 2,2'-diaminodiphenyl were weighed and introduced into a 50 ml. round-bottomed flask provided with a reflux condenser and a receiver, and then dissolved by heating in an oil bath in a water jet vacuum at 10 mm. Hg while being stirred.

At 120° C. a clear yellow solution was formed. On further heating to 150° C. the distillation of the phenol already started in the receiver. After heating for a further six hours at 180° C. 8.9 grams (0.09 mol, corresponding to 95% of theory) of phenol had condensed in the ice-water-cooled receiver. The reaction product (14.2 grams, corresponding to 98% of theory), a yellow resin, was recrystallized from xylene/cyclohexane. It also dissolved in chloroform, ethanol, toluene, but was insoluble in cyclohexane and petroleum ether. The melting point was 90–94° C.

$C_{18}H_{15}N_2P$ (290.3):

|  | P |
|---|---|
| Calculated | 10.68 |
| Found | 10.59 |

Example VI
2-p-TOLYL DIBENZO(d,f)-1,3,2-DIAZAPHOSPHEPINE

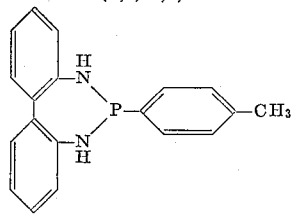

9.2 grams (0.05 mole) of 2,2'-diamonodiphenyl were dissolved with stirring in 15.4 grams (0.05 mole) of yellow p-tolylphosphonous acid diphenylester. Within 30 minutes the temperature of the oil bath was raised to 150° C. at a pressure of 10 mm. Hg (water jet pump vacuum) and the phenol formed collected in a receiver cooled with ice water.

Heating to 190° C. was continued for a further six hours. The reaction was then complete, no further phenol distilling over into the receiver. The yield of phenol was 8.5 grams (0.09 mole, corresponding to 90.5% of theory). The yellow, resinous reaction product (15.5 grams corresponding to 102% of theory) was recrystallized from xylene/cyclohexane. It was soluble in ethanol, chloroform and toluene, but insoluble in petroleum ether and cyclohexane. The melting point was 117–118° C.

$C_{19}H_{17}N_2P$ (304.3):

|  | N | P |
|---|---|---|
| Calculated | 9.22 | 10.2 |
| Found | 9.17 | 9.51 |

Example VII 11H,13H-12-PHENYLDIBENZ(d,h)-(11,13,12,5,6)-DIAZAPHOSPHADITHIONINE

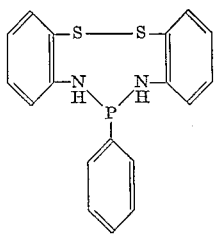

16.5 grams (¹⁄₁₅ mol) of 2,2′-diaminodiphenyldisulfide and 19.6 grams (¹⁄₁₅ mol) of phenylphosphonous acid diphenylester were weighed and introduced into a 100 ml. round-bottomed flask provided with a short descending condenser and a receiver. By means of a magnet stirrer the disulfide was dissolved in the ester by heating in an oil bath; the temperature was then raised to 180° C. within 30 minutes and a pressure of 10 mm. Hg was simultaneously created in the apparatus by means of a water jet pump.

After 2½ hours 12.95 grams (0.138 mol, corresponding to 103% of theory) of phenol had condensed in the ice-water-cooled receiver. The reaction product, which crystallized on cooling, was obtained in a yield of 22 grams; the melting point was 110–118° C. The crude product was recrystallized once from carbon tetrachloride. Yield: 16.5 grams (70% of theory), melting point: 159°–161° C.

$C_{18}H_{15}N_2PS_2$ (354.4):

|  | N | P | S |
|---|---|---|---|
| Calculated | 7.92 | 8.76 | 18.06 |
| Found | 7.33 | 8.63 | 17.65 |

Example VIII 11H,13H-12-p-TOLYLDIBENZ(d,h)(11,13,12,5,6)-DIAZAPHOSPHADITHIONINE

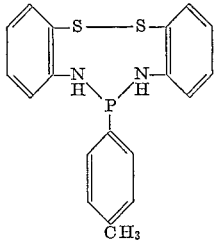

In the same manner as described in the previous example, 16.5 grams (¹⁄₁₅ mol) of 2,2′-diaminodiphenyldisulfide were added at 25° C. to 20.5 grams (¹⁄₁₅ mol) of p-tolylphosphonous acid diphenyl ester, a clear, light yellow solution being obtained. The solution was heated to 150° C. for 30 minutes with stirring and at a pressure of 10 mm. Hg.

Formation of phenol already started at 100° C. After three hours the amount of phenol collected in the receiver was 12.75 grams (0.136 mol). The reaction product solidified to a light yellow product on cooling. Yield: 24.09 (98% of theory), melting point: 99–102° C.

$C_{19}H_{17}N_2PS$ (368.5):

|  | N | P | S |
|---|---|---|---|
| Calculated | 7.62 | 8.42 | 17.40 |
| Found | 7.20 | 8.25 | 17.39 |

Example IX

11H-DIBENZ(d,h)-(11,13,12,5,6)-DIAZAARSADITHIONINE

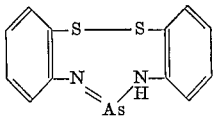

6.2 gram (0.025 mol) of 2,2′-diaminodiphenyldisulfide and 9.0 grams (0.025 mol) of triphenylarsenite were heated to 100° C. in an oil bath in a reflux condenser and at a pressure of 10 mm. Hg. During this heating one gram of phenol distilled over into the ice-cooled receiver and the solution turned greenish black.

The temperature was then raised to 150° C. for two hours and to 200° C. for half an hour. Meanwhile 6.5 grams of phenol (92.3% of theory) had condensed in the receiver. After cooling the deep green mass was reduced in a mortar; when left to stand it soon sinters. The resulting dark violet solution was therefore mixed in chloroform with four times its volume of carbon tetrachloride. After the mixture had been left to stand for two days a greyish-green granular precipitate separated, which was filtered off and dried. Yield: 2.1 grams (25.8% of theory), melting point: 95–100° C.

$C_{12}H_9AsN_2S$ (324.9):

|  | As | N | S |
|---|---|---|---|
| Calculated | 24.60 | 8.65 | 19.69 |
| Found | 21.35 | 8.24 | 18.69 |

Example X

11H-DIBENZ(d,h)-(11,13,12,5,6)-DIAZAPHOSPHADITHIONINE

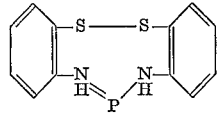

12.4 grams (0.05 mol) of 2,2′-diaminodiphenyldisulfide and 15.5 grams (0.05 mol) of triphenylphosphite (or 17.9 grams of triphenyltrithiophosphite) were heated to 180° C. in an oil bath. After only one hour a solid mass started separating from the solution. Phenol (or thiophhenol) was simultaneously formed. To increase the yield, the phenol thiophenol formed was withdrawn from the equilibrium at 10 mm. Hg and condensed in an ice-cooled receiver. The phenol evolution started at 150° C. After a total of six hours at 150° C., 12.2 grams of phenol (14.2 grams of this phenol), corresponding to 86% of theory, had condensed in the receiver. The reaction product was extracted several times with ether and dried in vacuo. Yield: 8.9 grams (65% of theory), melting point 333.5–334° C.

$C_{12}H_9N_2PS_2$ (276.3):

|  | N | P | S |
|---|---|---|---|
| Calculated | 10.14 | 11.23 | 23.20 |
| Found | 10.35 | 10.85 | 22.98 |

Example XI

11H-DIBENZ(d,h)-(11,13,12,5,6)-DIAZAPHOSPHADITHIONINE 12.4 grams (0.05 mol) of 2,2′-diaminodiphenyldisulfide and 17.65 grams (0.05 mol) of tri-p-cresylphosphite were treated as under Example X and worked up. The yield of p-cresol was 13 grams (80.3% of theory), the yield of ether-insoluble reaction product 10.0 grams (82% of theory) having a melting point of 327.5–328° C.

$C_{12}H_9N_2PS_2$ (276.3):

|  | N | P | S |
|---|---|---|---|
| Calculated | 10.14 | 11.23 | 23.20 |
| Found | 10.27 | 10.61 | 22.91 |

We claim as our invention:

1. The process of preparing heterocyclic nitrogen compounds which comprises reacting together a diamine selected from the group consisting of

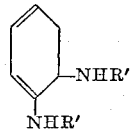

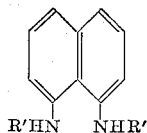

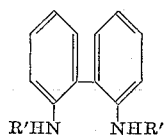

and

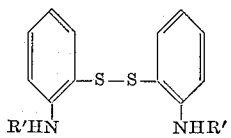

wherein R′ is selected from the group consisting of hydrogen, phenyl, and methyl-substituted phenyl with an ester, which is at least a diester, of the formula $$RY_mX(YR)_2$$

wherein X is selected from the group consisting of phosphorus and arsenic, Y is selected from the group consisting of oxygen and sulfur, R is a monovalent radical selected from the group consisting of hydrogen and hydrocarbon aryl having from 6 to 8 carbon atoms and at least two of which are such aryl radicals, and m is an integer from 0 to 1.

2. The process of claim 1 wherein the ester is the triaryl ester of an acid selected from the group consisting of phosphorous acid and arsenous acid, said aryl groups being hydrocarbon aryls of up to 8 carbon atoms.

3. The process of claim 1 wherein the diamine is an ortho-diamine benzene.

4. The process of claim 1 wherein the diamine is 2,2′-diaminodiphenyl sulfide.

5. The heterocyclic nitrogen compounds having structural formulas selected from the group consisting of (a)

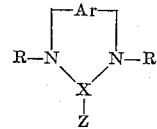

and (b)

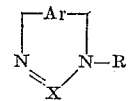

wherein Ar is a divalent radical selected from the group consisting of

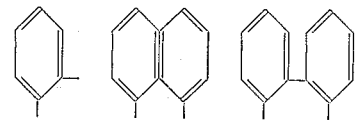

and

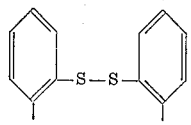

X is selected from the group consisting of phosphorus and arsenic, R is a monovalent radical selected from the group consisting of hydrogen, phenyl and methyl-substituted phenyl and Z is a monovalent radical selected from the group consisting of hydrocarbon aryl, aryloxy and arylmercapto and having up to 8 carbon atoms.

6. 11H-dibenz(d,h)-(11,13,12,5,6)-diazaarsadithionine.
7. 11H - dibenz(d,h) - (11,13,12,5,6)-diazaphosphadithionine.
8. 1H,3H-2-p-tolyl-benzo(d)-1,3,2-diazaphosphole.
9. 1-phenyl-benzo(d)-1,3,2-diazaphosphole.
10. 3-H-2-phenoxy-2-phohsphaperimidine.
11. 2-phenoxy-dibenzo(d,f)-1,3,2-diazaphosphepine.
12. 2-phenyl-dibenzo(d,f)-1,3,2-diazaphosphepine.
13. 2-p-tolyl-dibenzo(d,f)-1,3,2-diazaphosphepine.
14. 11H,13H - 12 - phenyldibenz(d,h) - (11,13,12,5,6)-diazaphosphadithionine.
15. 11H,13H - 12 - p - tolyldibenz(d,h)(11,13,12,5,6)-diazaphosphadithionine.

No references cited.